United States Patent
Asano et al.

(10) Patent No.: US 9,944,482 B2
(45) Date of Patent: Apr. 17, 2018

(54) MOTOR CONTROL DEVICE, SHEET CONVEYING DEVICE, AND IMAGE FORMING APPARATUS

(71) Applicants: Yoshihiro Asano, Kanagawa (JP); Shingo Nagatsuka, Kanagawa (JP); Takuya Murata, Tokyo (JP); Kentaroh Kurosu, Kanagawa (JP); Motoharu Takahashi, Kanagawa (JP)

(72) Inventors: Yoshihiro Asano, Kanagawa (JP); Shingo Nagatsuka, Kanagawa (JP); Takuya Murata, Tokyo (JP); Kentaroh Kurosu, Kanagawa (JP); Motoharu Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/198,154

(22) Filed: Jun. 30, 2016

(65) Prior Publication Data

US 2017/0001822 A1 Jan. 5, 2017

(30) Foreign Application Priority Data

Jul. 2, 2015 (JP) .................................. 2015-133969
May 18, 2016 (JP) .................................. 2016-099616

(51) Int. Cl.
*H02P 1/04* (2006.01)
*B65H 7/20* (2006.01)
*H02P 3/02* (2006.01)
*B65H 5/06* (2006.01)
*G03G 15/00* (2006.01)

(52) U.S. Cl.
CPC ............. *B65H 7/20* (2013.01); *B65H 5/062* (2013.01); *G03G 15/5004* (2013.01); *H02P 3/025* (2013.01); *B65H 2403/92* (2013.01); *B65H 2513/512* (2013.01); *B65H 2515/702* (2013.01); *B65H 2515/704* (2013.01); *B65H 2801/06* (2013.01)

(58) Field of Classification Search
CPC . H02H 7/1227; H02H 7/0833; H02P 29/0241
See application file for complete search history.

(56) References Cited

U.S. PATENT DOCUMENTS

| 9,625,512 B2 * | 4/2017 | Crosman, III ....... G01R 31/025 |
| 2007/0252547 A1 * | 11/2007 | Kifuku .................... H02P 23/06 |
| | | 318/432 |
| 2013/0176588 A1 * | 7/2013 | Oi .......................... G06K 15/02 |
| | | 358/1.14 |

FOREIGN PATENT DOCUMENTS

| JP | 2001-268972 | 9/2001 |
| JP | 2002-084780 | 3/2002 |
| JP | 3889669 | 12/2006 |
| JP | 2007-244144 | 9/2007 |

* cited by examiner

*Primary Examiner* — Karen Masih
(74) *Attorney, Agent, or Firm* — Harness, Dickey & Pierce, P.L.C.

(57) ABSTRACT

A motor control device includes: an electric-current detection unit configured to detect an electric current that flows through a motor at a time when the motor is not to be driven; a voltage-polarity determining unit configured to determine polarity of a voltage corresponding to the detected electric current; and an operating-state management unit configured to perform control of stopping the motor depending on the polarity of the voltage.

17 Claims, 10 Drawing Sheets

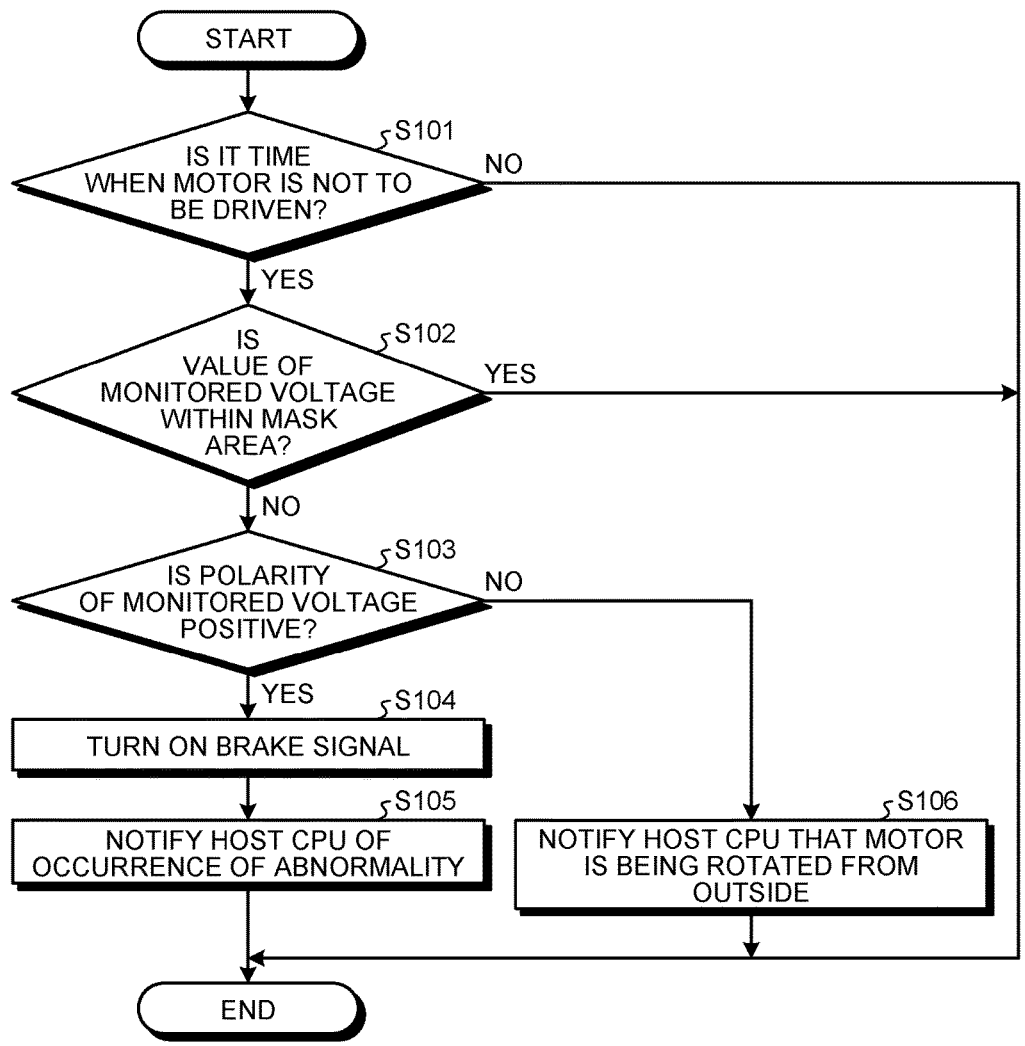

MOTOR CONTROL DEVICE, SHEET CONVEYING DEVICE, AND IMAGE FORMING APPARATUS

CROSS-REFERENCE TO RELATED APPLICATIONS

The present application claims priority under 35 U.S.C. § 119 to Japanese Patent Application No. 2015-133969, filed Jul. 2, 2015 and Japanese Patent Application No. 2016-099616, filed May 18, 2016. The contents of which are incorporated herein by reference in their entirety.

BACKGROUND OF THE INVENTION

1. Field of the Invention

The present invention relates to a motor control device, a sheet conveying device, and an image forming apparatus.

2. Description of the Related Art

In an image forming apparatus, many motors including a motor for conveying sheets used in image forming are installed, for example. As a control technique for such a motor, known has been a technique in which a central processing unit (CPU) sends to a motor driver a drive signal such as a pulse width modulation (PWM) signal in accordance with a control voltage applied to the motor and the motor driver drives the motor based on the drive signal.

Normally, no electric current flows through the motor when the motor is not to be driven. However, if some kind of abnormality occurs on the drive signal sent to the motor driver from the CPU, the motor driver may cause a serious damage to the motor as the motor driver attempts to drive the motor at a maximum control voltage, even though it is a time when the motor is not to be driven. Therefore, preventing the erroneous operation during a time when the motor is not to be driven is desired.

As a technique to prevent the erroneous operation during a time when the motor is not to be driven, the technique described in Japanese Patent No. 3889669 has been known, for example. This technique interrupts control power supplies for both isolation circuits of two-division type to switches a driver unit into a state where the motor is not driven, and switches a braking device into a brake operating state, to maintain the motor in a stopped state at a time when the motor is not to be driven.

However, the technique described in Japanese Patent No. 3889669 is configured to bring the braking device into a brake operating state to maintain a stopped state of the motor at a time when the motor is not to be driven, and the scale of apparatus configuration becomes large. Therefore, preventing the erroneous operation during time when the motor is not to be driven more easily is desired.

SUMMARY OF THE INVENTION

According to one aspect of the invention, a motor control device includes an electric-current detection unit, a voltage-polarity determining unit and an operating-state management unit. The electric-current detection unit is configured to detect an electric current that flows through a motor at a time when the motor is not to be driven. The voltage-polarity determining unit is configured to determine polarity of a voltage corresponding to the detected electric current. The operating-state management unit is configured to perform control of stopping the motor depending on the polarity of the voltage.

BRIEF DESCRIPTION OF THE DRAWINGS

FIG. 6 is a flowchart for explaining one example of a processing sequence executed by the CPU at a time when the motor is not to be driven;

The accompanying drawings are intended to depict exemplary embodiments of the present invention and should not be interpreted to limit the scope thereof identical or similar reference numerals designate identical or similar components throughout the various drawings.

DETAILED DESCRIPTION OF THE PREFERRED EMBODIMENTS

Figure 1:
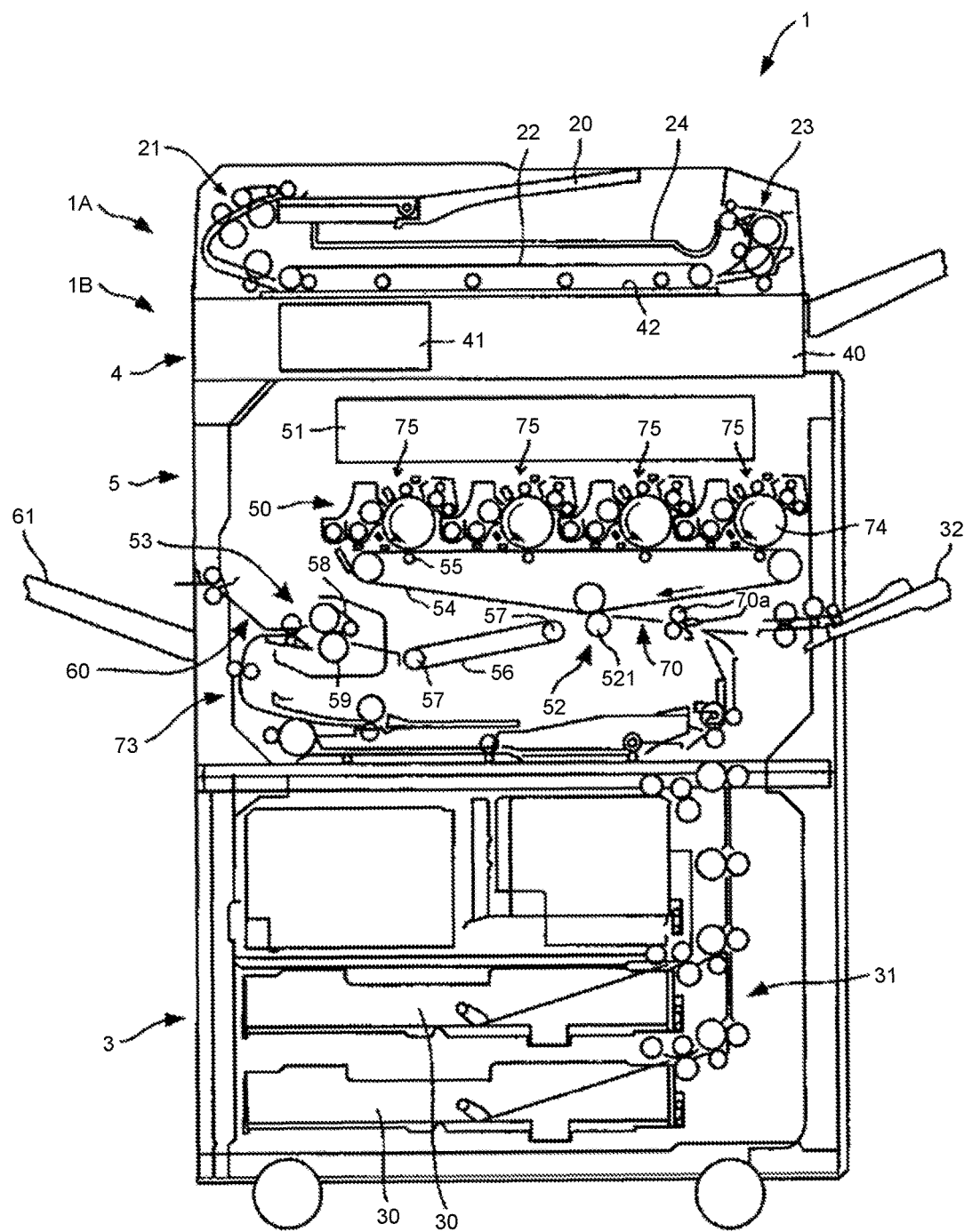
FIG. 1 is a schematic configuration view illustrating an image forming apparatus.

The terminology used herein is for the purpose of describing particular embodiments only and not intended to be limiting of the present invention.

As used herein, the singular forms "a", "an" and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments of a motor control device, a sheet conveying device, and an image forming apparatus according to the present invention are described in detail with reference to the accompanying drawings. The following describes a tandem color copying machine of an intermediate transfer system as an example of the image forming apparatus to which the present invention can be applied.

First Embodiment

FIG. 1 is a schematic configuration view illustrating an image forming apparatus 1 according to the present embodiment. As illustrated in FIG. 1, the image forming apparatus 1 includes an auto document feeder (ADF) 1A and an apparatus main body 1B. The apparatus main body 1B includes a paper feeding unit 3, an image reading unit 4, and an image forming unit 5.

The ADF 1A includes a document tray 20, a document feeding roller 21, a document carriage belt 22, a document discharging roller 23, and a document ejection tray 24. The ADF 1A is attached to the image reading unit 4 so as to be opened and closed through an opening/closing mechanism such as a hinge.

The document feeding roller 21 separates a document from a document bundle placed on the document tray 20 one by one to convey the document to the image reading unit 4. The document carriage belt 22 conveys the document separated by the document feeding roller 21 to the image reading unit 4. The document ejection roller 23 discharges the document that is discharged from the image reading unit 4 by the document carriage belt 22 to the document ejection tray 24 under the document tray 20.

The image reading unit 4 includes a housing 40, an optical scanning unit 41, a contact glass 42, and a driving unit. The optical scanning unit 41 includes a light emitting diode (LED) unit and is provided in the housing 40. The optical scanning unit 41 irradiates the document with light in the main scanning direction from the LED unit and scans the document in the whole irradiation region in the sub-scanning direction by the driving unit. Thereby, the optical scanning unit 41 reads a two-dimensional color image on the document.

The contact glass 42 is provided above the housing 40 of the image reading unit 4 and forms an upper surface portion of the housing 40. The driving unit includes a wire fixed to the optical scanning unit 41, a plurality of driven pulleys and a driving pulley (not illustrated) around which the wire is wound, and a motor for rotating the driving pulley.

The paper feeding unit 3 includes paper cassettes 30 and a feeding unit 31. The paper cassettes 30 accommodate pieces of paper as recording media having different paper sizes. The feeding unit 31 conveys the paper accommodated in the paper cassette 30 to a main conveying path 70 of the image forming unit 5.

A bypass tray 32 is arranged on the side surface of the image forming unit 5 so as to be opened and closed with respect to the image forming unit 5. A paper bundle is set on the tray upper surface in a state where the bypass tray 32 is opened with respect to the image forming unit 5. The uppermost paper of the set paper bundle is fed to the main conveying path 70 by a feed-out roller of the bypass tray 32.

A pair of registration rollers 70a are arranged on the main conveying path 70. The pair of registration rollers 70a nip the paper that is conveyed through the main conveying path 70 between the rollers, and then, feeds the paper toward a secondary transfer nip at a predetermined timing.

The image forming unit 5 includes an exposure unit 51, a tandem image formation unit 50, an intermediate transfer belt 54, intermediate transfer rollers 55, a secondary transfer device 52, and a fixing unit 53, for example. Furthermore, the image forming unit 5 includes the main conveying path 70, a reverse conveying path 73, and a discharging path 60, for example.

As illustrated in FIG. 1, the exposure unit 51 is arranged so as to be adjacent to the tandem image formation unit 50. The exposure unit 51 exposes photoconductor drums 74 to light. The photoconductor drums 74 are provided so as to correspond to respective colors of yellow, cyan, magenta, and black.

The tandem image formation unit 50 includes four image forming units 75 for yellow, cyan, magenta, and black that are arranged on the intermediate transfer belt 54 along the rotating direction of the intermediate transfer belt 54. Although detail illustration is omitted, the respective image forming units 75 include charging devices, developing devices, photosensitive-element cleaning devices, and neutralization devices around the photoconductor drums 74 provided for the above-mentioned respective colors. Each photoconductor drum 74 and the above-mentioned respective devices provided around the photoconductor drum 74 are unitized into one process cartridge.

The tandem image formation unit 50 forms visible images (toner images) with toners of the respective colors on the photoconductor drums 74 based on image information that has been read by the image reading unit 4 and exploded into the respective colors. The visible images formed on the respective photoconductor drums 74 are transferred onto the intermediate transfer belt 54 between the respective photoconductor drums 74 and the intermediate transfer rollers 55.

The secondary transfer device 52 is provided at the side opposite to the tandem image formation unit 50 with the intermediate transfer belt 54 interposed therebetween. The secondary transfer device 52 includes a secondary transfer roller 521 as a transfer member. The secondary transfer roller 521 is pressed against the intermediate transfer belt 54 so as to form the secondary transfer nip. The toner images formed on the intermediate transfer belt 54 are transferred onto the paper conveyed through the main conveying path 70 from the paper feeding unit 3 on the secondary transfer nip.

The paper onto which the toner images have been transferred on the secondary transfer nip is fed to the fixing unit 53 by a paper conveyance belt 56 wound around two supporting rollers 57.

A pressing roller 59 is pressed against a fixing belt 58 as an endless belt so as to constitute the fixing unit 53. The fixing unit 53 applies heat and pressure to the paper by the pressing roller 59 so as to melt the toners on the toner images transferred onto the paper and fix a color image onto the paper.

The paper onto which the color image has been fixed in the above-mentioned manner is stacked on a paper ejection tray 61 through the paper ejection path 60 as a paper election conveying path.

As illustrated in FIG. 1, the reverse conveying path 73 is provided under the secondary transfer device 52 and the fixing unit 53. The reverse conveying path 73 reverses the front and rear sides of the paper discharged from the fixing unit 53 and supplies the paper to the secondary transfer device 52 through the main conveying path 70 again in order to form images on both the sides of the paper.

In the image forming apparatus 1 configured as described above, the ADF 1A functions as a sheet conveying device that conveys a document that is one example of a sheet. Furthermore, the feeding unit 31 of the paper feeding unit 3 in the apparatus main body 1B, the main conveying path 70, the reverse conveying path 73, and the discharging path 60 of the image forming unit 5 in the apparatus main body 1B function as respective sheet conveying devices that convey a document that is one example of a sheet. These sheet conveying devices make the roller members rotate by the power of motors and convey the sheet. The image forming apparatus 1 in the present embodiment includes motor control devices described in the following to control the motors of these sheet conveying devices.

Figure 2:
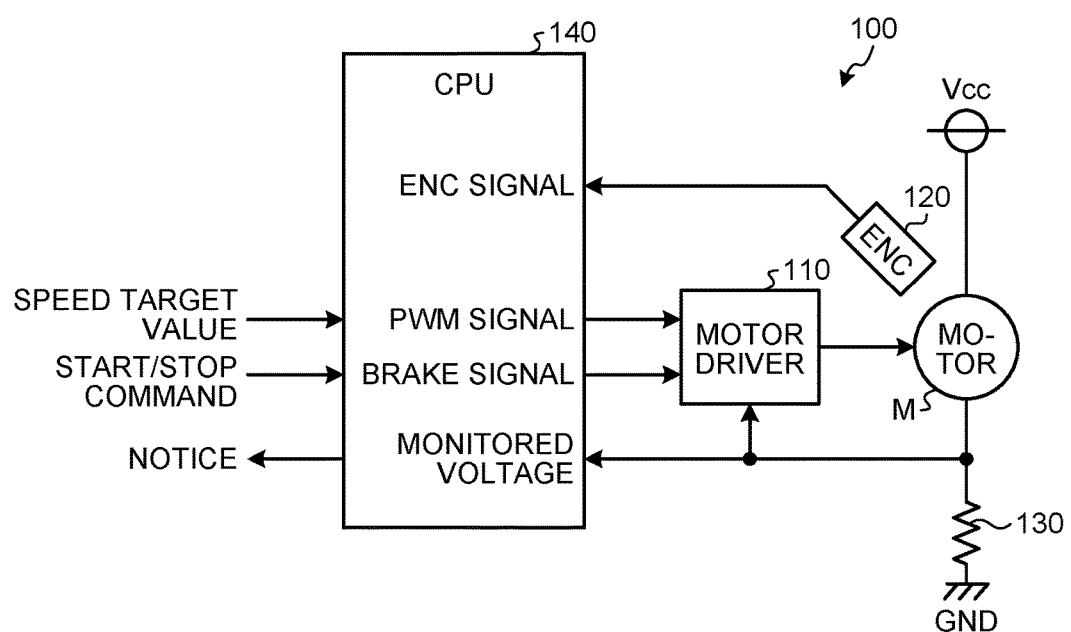
FIG. 2 is a hardware configuration diagram illustrating a motor control device.

FIG. 2 is a hardware configuration diagram illustrating a motor control device 100 in the present embodiment. As illustrated in FIG. 2, the motor control device 100 in the present embodiment includes a motor driver 110 that drives a motor M, an encoder (ENC) 120 that detects the rotation speed of the motor M, a shunt resistor 130 that detects an electric current that flows through the motor M, and a CPU 140 that controls the operation of the motor driver 110.

In the present embodiment, the motor M of a control target is assumed to be a brushless motor. The motor M of a control target, however, is not limited to a brushless motor, and various types of motor M can be defined as a control target. Although the encoder 120 is used to detect the rotation speed of the motor M in the present embodiment, the rotation speed of the motor M may be detected by other methods.

The motor driver 110 includes a switching circuit to which terminals of windings of the motor M are connected. The motor driver 110 controls the operation of the switching circuit based on a PWM signal (one example of a drive signal) sent from the CPU 140 so as to adjust the amount of electric current flowing from a motor power supply Vcc to a ground GND passing through the motor M and drive the motor M at an intended control voltage. Furthermore, the motor driver 110 controls the operation of the switching circuit so as to interrupt the electric current flowing from the motor power supply to the ground GND passing through the motor M and stop the motor M when a brake signal sent from the CPU 140 is turned on (logical value "1").

Although an example in which a PWM signal is used as a drive signal that is sent to the motor driven 110 from the CPU 140 is described in the present embodiment, the drive signal only needs be a signal in accordance with the control voltage applied to the motor M, and the drive signal is not limited to the PWM signal. For example, a PPM signal (pulse-frequency modulation signal) may be used as the drive signal, and the drive signal may an analog signal.

The motor driver 110 is provided with at least a terminal for inputting the PWM signal, a terminal for inputting the brake signal, and a terminal for inputting a start/stop signal. Of the foregoing, the terminal for inputting the PWM signal and the terminal for inputting the brake signal are connected to the CPU 140 (a later-described control-signal output unit 143) via respective harnesses. Meanwhile, the output to the terminal for inputting the start/stop signal is fixed to indicate the start. That is, although the motor driver 110 is configured to control the operation of the switching circuit based on the PWM signal when the start/stop signal indicates the start, the motor driver 110 recognizes the start/stop signal as indicating the start at all times. When a meaningful PWM signal (PWM signal including an on section (a section of logical value "1")) is sent from the CPU 140 via the harness, the motor driver 110 controls the operation of the switching circuit based on the PWM signal.

Although two signals of the PWM signal and the brake signal are sent to the motor driver 110 from the CPU 140 in the present embodiment, a rotation direction signal indicative of the direction of rotation of the motor M may be sent in addition. In this case, the motor driver 110 is further provided with a terminal to which the rotation direction signal is input, and switches switching elements of control targets in the switching circuit in accordance with the rotation direction signal that the terminal outputs.

Furthermore, in the present embodiment, it is assumed that the PWM signal and the brake signal sent to the motor driver 110 from the CPU 140 are the signals of a negative logic (a signal that indicates on with a Lo level). Accordingly, when a short circuit fault by such as pinching occurs on the harness sending the PWM signal, the PWM signal is made into a signal in which an on section continues, that is, a signal that drives the motor M at a maximum control voltage. For this reason, when such a fault occurs, the motor driver 110 attempts to drive the motor M at the maximum control voltage during a time when the motor M is not to be driven and a serious damage to the motor M may result. Therefore, in the present embodiment, the CPU 140 determines the presence of such erroneous operation during a time when the motor M is not to be driven. When the motor M is erroneously operating, the CPU 140 turns on the brake signal and stops the motor M. Meanwhile, when a short circuit fault by such as pinching occurs on the harness sending the brake signal, the terminal of the motor driver 110 to which the brake signal is input is made such that the brake signal is fixed to on and the motor M is maintained in a stopped state.

It should be noted that, even if the PWM signal is the signal of positive logic (a signal that indicates on with a Hi level), the same erroneous operation arises when an open circuit fault such as disconnection occurs on the harness sending the brake signal. Consequently, the above-mentioned function in the present embodiment is effective. It is desirable that the motor driver 110 be configured such that the output to the terminal to input the brake signal is fixed to on when abnormality occurs on the harness sending the brake signal regardless of a short circuit fault or an open circuit fault.

The encoder 120 outputs an ENC signal in accordance with the rotation speed of the motor M. The ENC signal is a signal representing the current driving state of the motor M and is used to perform speed feedback control of the motor M in the CPU 140, for example.

The shunt resistor 130 is a resistor connected in series between the motor M and the ground GND, and detects an electric current that flows through the motor M, for example. That is, when the electric current flows through the motor M, a potential difference in accordance with the magnitude of the electric current is generated at both ends of the shunt resistor 130. The electric current that flows through the motor M can be detected from the potential difference.

The shunt resistor 130 is normally used for the detection of over-current during a time when the motor M is to be driven. In other words, the motor driver 110 performs current limiting so that the electric current detected with the shunt resistor 130 does not become excessive. In the present embodiment, the potential difference generated at both ends of the shunt resistor 130 is input to the CPU 140 as a monitored voltage and is used to detect the electric current that flows through the motor M at a time when the motor M is not to be driven. The electric current detection using the shunt resistor 130 is a method that, in particular, detects the electric current inexpensively and easily among the methods of detecting the electric current that flows through the motor M.

The CPU 140 receives inputs of a speed target value and a start/stop command from a host CPU and receives an input of the ENC signal from the encoder 120, and the CPU 140 outputs the PWM signal and the brake signal to the motor driver 110 and controls the operation of the motor driver 110. Furthermore, the CPU 140 receives an input of the above-mentioned monitored voltage at a time when the motor M is not to be driven, and determines the presence of erroneous operation during a time when the motor M is not to be driven based on the monitored voltage. Then, when it is determined that the motor M is erroneously operating, the CPU 140 turns on the brake signal and stops the motor M, and notifies the host CPU that the abnormality has occurred. a time when the motor M is not to be driven means a state in which a command to drive the motor M, that is, a start command and the speed target value of the motor M, is not being input to the CPU 140 from the host CPU. It should be noted that the host CPU is one example of a host control device that controls the operation of a whole of the image forming apparatus 1 that is equipped with the motor control device 100 of the present embodiment. The CPU 140 of the motor control device 100 is connected to the host CPU so as to be able to perform communication.

Figure 3:
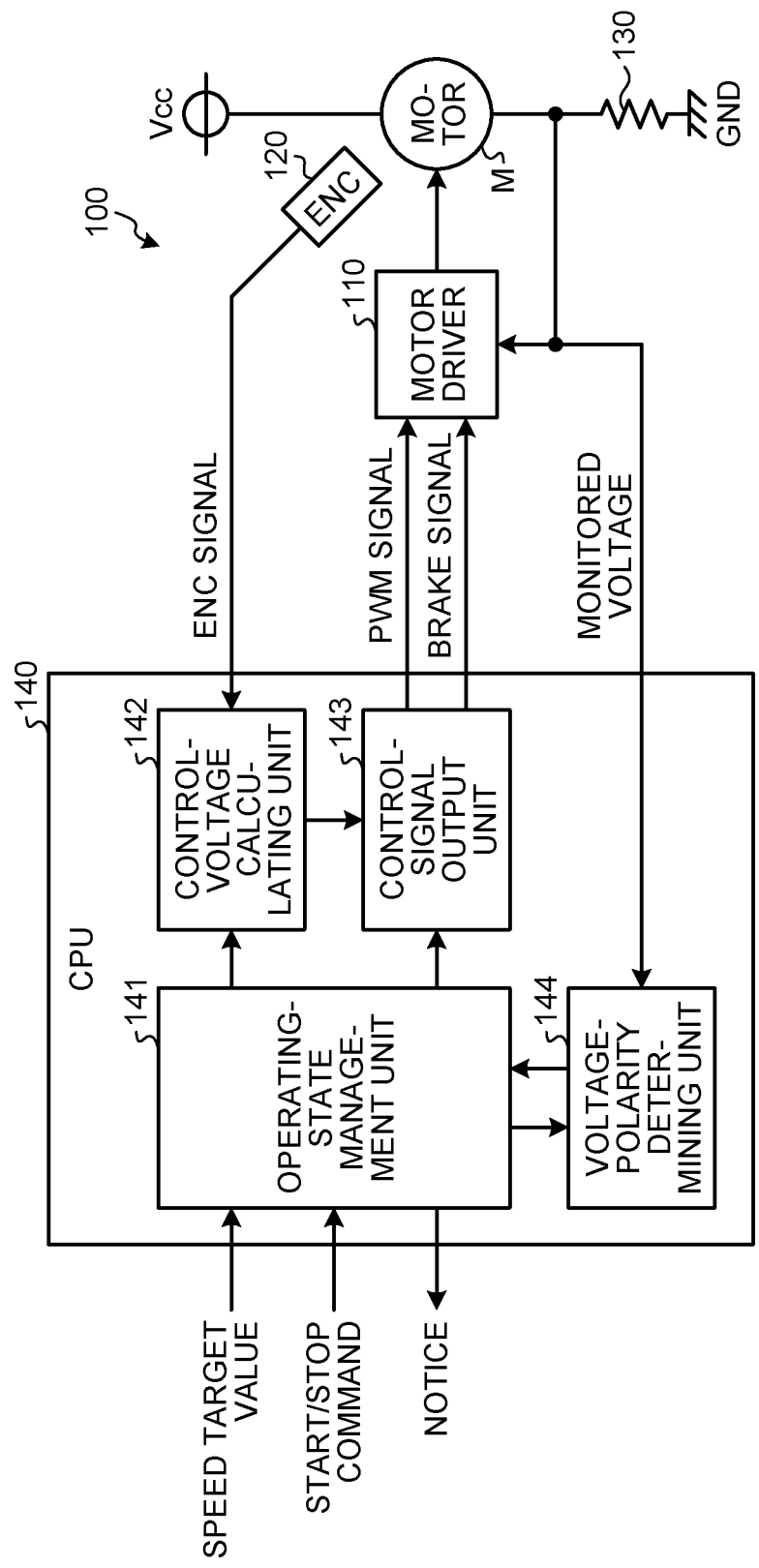
FIG. 3 is a block diagram illustrating an example of the functional configuration implemented by a CPU.

FIG. 3 is a block diagram illustrating an example of the functional configuration implemented by the CPU 140. As illustrated in FIG. 3, the CPU 140 includes, as functional constituent elements relating to the motor control in the present embodiment, an operating-state management unit 141, a control-voltage calculating unit 142, a control-signal output unit 143, and a voltage-polarity determining unit 144. These functional constituent elements are implemented by the CPU 140 executing a predetermined control program, for example. The whole of or a part of these functional constituent elements can also be implemented by using not the CPU 140 that is a general-purpose processor but dedicated hardware such as an application-specific integrated circuit (ASIC) and a field-programmable gate array (FPGA), for example.

The operating-state management unit 141 outputs instructions to the control-voltage calculating unit 142 and the control-signal output unit 143 such that the operating state of the motor M becomes the operating state in accordance with instructions from the host CPU. In other words, when a start command of the motor M is input from the host CPU, the operating-state management unit 141 instructs the control-signal output unit 143 to turn off the brake signal. Furthermore, the operating-state management unit 141 delivers to the control-voltage calculating unit 142 a speed target value that is input from the host CPU together with the start command of the motor M, and instructs the control-voltage calculating unit 142 to calculate a control voltage to be applied to the motor M. Meanwhile, when a stop command of the motor M is input from the host CPU, the operating-state management unit 141 instructs the control-signal output unit 143 to turn on the brake signal and stops the motor M.

Furthermore, the operating-state management unit 141 instructs the voltage-polarity determining unit 144 to determine whether the motor M is erroneously operating at a time when the motor M is not to be driven. Then, when the voltage-polarity determining unit 144 determines that the motor M is erroneously operating, the operating-state management unit 141 instructs the control-signal output unit 143 to turn on the brake signal and stops the motor M, and notifies the host CPU that the abnormality has occurred. Furthermore, when the voltage-polarity determining unit 144 determines that the motor M is in a state in which the motor M is rotated from the outside, the operating state management unit 141 notifies the host CPU that the motor M is being rotated from the outside. The voltage-polarity determining unit 144 determines the erroneous operation of the motor M depending on the polarity of the monitored voltage during a time when the motor M not to be driven, which will be described later.

The control-voltage calculating unit 142 compares the speed target value delivered together with the control-voltage calculation instruction from the operating-state management unit 141 with the current rotation speed of the motor M represented by the ENC signal input from the encoder 120, and calculates the control voltage to be applied to the motor M so as to correct the speed deviation. The control voltage calculated by the control-voltage calculating unit 142 is delivered to the control-signal output unit 143.

The control-signal output unit 143 outputs the PWM sign corresponding to the control voltage calculated by the control-voltage calculating unit 142. Furthermore, the control-signal output unit 143 outputs the brake signal the on/off of which is controlled by the operating-state management unit 141. The PWM signal and the brake signal that the control-signal output unit 143 outputs are, as described above, sent to the motor driver 110 from the CPU 140 via the respective harnesses and are input to the respective terminals of the motor driver 110.

The voltage-polarity determining unit 144 receives an input of, as the monitored voltage, the potential difference generated at both ends of the shunt resistor 130 that detects the electric current that flows through the motor M at a time when the motor M is not to be driven. Then, the voltage-polarity determining unit 144 determines whether the motor M is erroneously operating depending on the polarity of the monitored voltage. That is, the polarity of the monitored voltage corresponding to the electric current that flows toward the ground GND from the motor power supply Vcc passing through the motor M is assumed to be positive. In this case, when the polarity of the monitored voltage is positive, the voltage-polarity determining unit 144 determines that the motor M is erroneously operating. By contrast, when the polarity of the monitored voltage is negative, the voltage-polarity determining unit 144 determines that the motor M is in a state in which the motor M is rotated from the outside. The state in which the motor M is rotated from the outside means a state in which the motor M is rotated, not by the drive of the motor driver 110, such as a case in which, when a paper jam occurs on the image forming apparatus 1 and an operator performs the work of pulling out a sheet (document or paper), the motor M is co-rotated, for example.

Figure 4A:
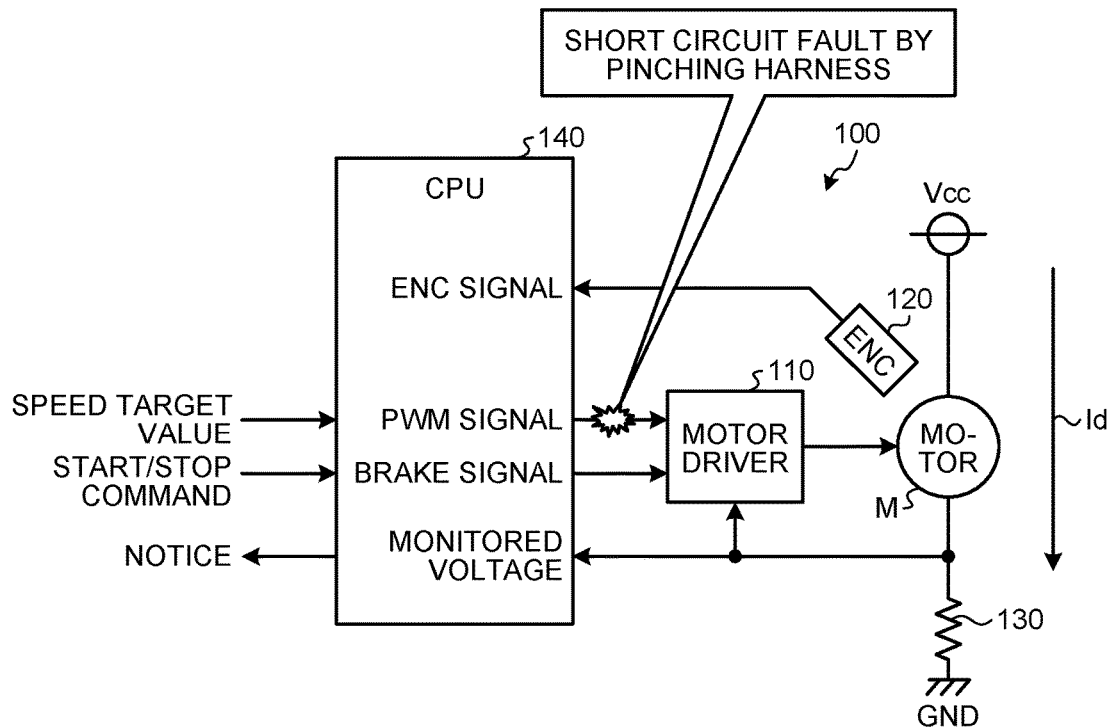
FIGS. 4A and 4B are graphs for explaining a phenomenon that an electric current flows at a time when a motor is not to be driven.
Figure 4B:
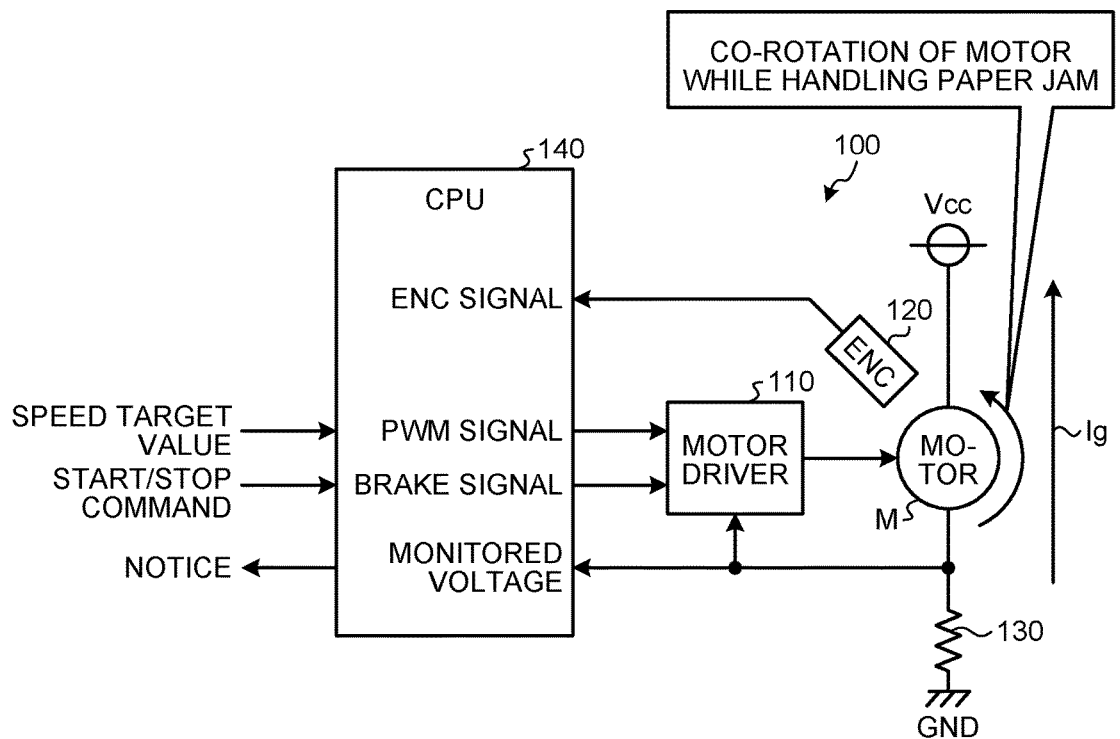

FIGS. 4A and 4B are graphs for explaining a phenomenon in which an electric current flows at a time when the motor M is not to be driven. FIG. 4A illustrates an example in which a short circuit fault has occurred on the harness sending the PWM signal to the motor driver 110 from the CPU 140, and FIG. 4B illustrates an example in which the motor M is co-rotated while a paper lam is being handled.

When a short circuit fault such as pinching occurs on the harness sending the PWM signal, the PWM signal becomes a signal in which an on section continues, and the motor driver 110 attempts to drive the motor M at a maximum control voltage. As a result, as illustrated in FIG. 4A, a motor driving current Id in the direction toward the ground GND from the motor power supply Vcc passing through the motor M flows. Because the polarity of the monitored voltage corresponding to the motor driving current Id is positive, the voltage-polarity determining unit 144 of the CPU 140 determines that the motor M is erroneously operating.

Meanwhile, when the motor M is co-rotated by the operator performing the work of pulling out a sheet while a paper jam is being handled on the image forming apparatus the motor M operates as a power generator. As a result, as illustrated in FIG. 4B, a motor generated current Ig in the direction toward the motor power supply Vcc from the ground GND passing through the motor M flows. Because the polarity of the monitored voltage corresponding to the motor generated current Ig is negative, the voltage-polarity determining unit 144 of the CPU 140 determines that the motor M is in a state in which the motor M is rotated from the outside.

As described above, the phenomenon in which an electric current flows a time when the motor M is not to be driven occurs not only when the motor M is erroneously operating due to a short circuit fault on the harness sending the PWM signal but also when the motor M is in a state in which the motor M is rotated from the outside such as a case in which the motor M is being co rotated while a paper jam is being handled, for example. Consequently, if the motor M is determined as being erroneously operating when an electric current flows at a time when the motor M is not to be driven, it is erroneously determined that the motor M is erroneously operating even when the motor M is being rotated from the outside. Therefore, in the present embodiment, the monitored voltage corresponding to the electric current that flows at a time when the motor M is not to be driven is input to the CPU 140. Then, depending on the polarity of the monitored voltage, the voltage-polarity determining unit 144 of the CPU 140 determines whether the motor M is erroneously operating or whether the motor M is in a state in which the motor M is rotated from the outside.

When no electric current is flowing through the motor M, because the potential difference at both ends of the shunt resistor 130 is normally zero, the value of the monitored voltage input to the CPU 140 also is zero. However, due to the mixture of noise for example, the monitored voltage may indicate a value other than zero even though no electric current is flowing through the motor M. Therefore, the range of voltage values whose absolute value is below a predetermined reference value may be set as a mask area, and such that the determination by the voltage-polarity determining unit 144 is not performed if the value of the monitored voltage is within the mask area. That is, it is desirable that the voltage-polarity determining unit 144 determine the polarity of the monitored voltage when the value (absolute value) of the monitored voltage exceeds the reference value and the voltage-polarity determining unit 144 then determine, depending on the polarity of the monitored voltage, whether the motor M is erroneously operating or whether the motor M is in a state in which the motor M is rotated from the outside.

Figure 5A:
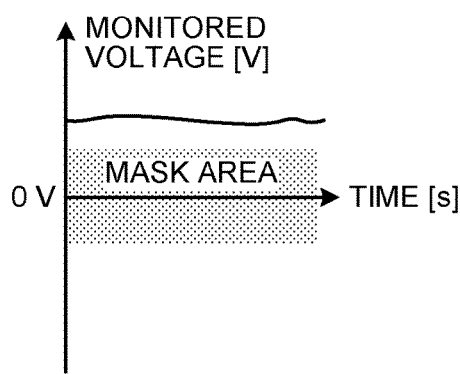
FIGS. 5A and 5B are diagrams for explaining a mask area that is set for a monitored voltage.
Figure 5B:
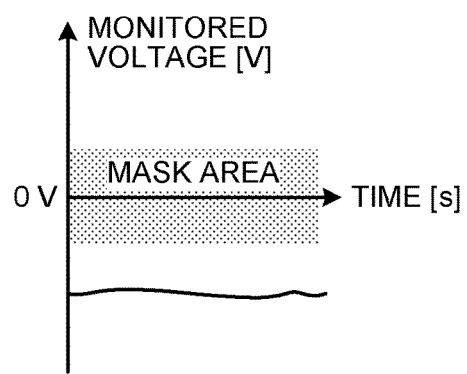

FIGS. 5A and 5B are diagrams for explaining a mask area that is set for the monitored voltage. The mask area is set in the range of approximately ±10 V, for example. In the example illustrated in FIG. 5A, the value of the monitored voltage is not within the mask area and the polarity of the monitored voltage is positive. The voltage-polarity determining unit 144 consequently determines that the motor M is erroneously operating. In the example illustrated in FIG. 5B, the value of the monitored voltage is not within the mask area and the polarity of the monitored voltage is negative. The voltage-polarity determining unit 144 consequently determines that the motor M is in a state in which the motor M is rotated from the outside.

As described above, when the voltage-polarity determining unit 144 determines that the motor M is erroneously operating, the operating-state management unit 141 instructs the control-signal output unit 143 to turn on the brake signal and stops the motor M, and notifies the host CPU that the abnormality has occurred. Thereby, the erroneous operation during a time when the motor M is not to be driven can be prevented effectively. Furthermore, by performing such control as displaying a warning of the occurrence of abnormality on an operation panel, the host CPU can prompt the operator to promptly recover the abnormality that is the cause of the erroneous operation of the motor M, for example.

When the voltage-polarity determining unit 144 determines that the motor M is in a state in which the motor M is rotated from the outside, the operating-state management unit 141 notifies the host CPU that the motor M is being rotated from the outside, as described above. This notice is used as useful information for the host CPU to perform the control such that a paper jam is being handled is displayed on the operation panel, and to determine the timing of starting the processing of inputting the signals of sensors provided in the sheet conveying path to detect whether the sheet remains, for example. However, the notice to the host CPU from the operating-state management unit 141 is not compulsory, and it is enough that a necessary notice is provided as necessary.

Furthermore, the operating-state management unit 141 may be configured to have the function of determining whether the motor M is erroneously operating depending on the polarity of the monitored voltage. In this case, the voltage-polarity determining unit 144 determines the polarity of the monitored voltage when the value of the monitored voltage is not within the mask area, that is, when the value (absolute value) of the monitored voltage exceeds the reference value, for example. The voltage-polarity determining unit 144 then delivers the determination result indicative of the polarity of the monitored voltage to the operating-state management unit 141. Then, when the polarity of the monitored voltage is positive, the operating-state management unit 141 instructs the control-signal output unit 143 to turn on the brake signal and stops the motor M, and notifies the host CPU that the abnormality has occurred. Furthermore, when the polarity of the monitored voltage is negative, the operating-state management unit 141 notifies the host CPU that the motor M is in a state in which the motor M is rotated from the outside.

Next, the operation of the motor control device 100 of the present embodiment during a time when the motor M is not to be driven is described with reference to the flowchart in FIG. 6. FIG. 6 is a flowchart for explaining one example of a processing sequence executed by the CPU 140 at a time when the motor M is not to be driven.

First, the operating-state management unit 141 determines whether it is a time when the motor M is not to be driven (step S101). If it is a time when the motor M is to be driven (No at step S101), the processing sequence ends as is. If it is a time when the motor M is not to be driven (Yes at step S101), the voltage-polarity determining unit 144 reads the monitored voltage in accordance with the instruction from the operating-state management unit 141 and determines whether the value of the monitored voltage is within the mask area (step S102). If the value of the monitored voltage is within the mask area (Yes at step S102), the processing sequence ends as is. If the value of the monitored voltage is not within the mask area (No at step S102), the voltage-polarity determining unit 144 determines whether the polarity of the monitored voltage is positive (step S103).

As a result of the determination at step S103, when the polarity of the monitored voltage is positive (Yes at step S103), the control-signal output unit 143 turn on the brake signal in accordance with the instruction from the operating-state management unit 141 (step S104) and stops the motor M. Furthermore, the operating-state management unit 141 notifies the host CPU that the abnormality has occurred (step S105), and the processing sequence ends. If the polarity of the monitored voltage is negative as a result of the determination at step S103 (No at step S103), the operating-state management unit 141 notifies the host CPU that the motor M is being rotated from the outside (step S106), and the processing sequence ends.

As described above in detail using the specific example, the motor control device 100 of the present embodiment inputs the monitored voltage corresponding to the electric current that flows through the motor M to the CPU 140 at a time when the motor M is not to be driven, and the CPU 140 performs the control of stopping the motor M depending on the polarity of the monitored voltage. Accordingly, the motor control device 100 of the present embodiment can easily prevent the erroneous operation during a time when the motor M is not to be driven.

In a conventional commonly used motor control device, a start/stop signal is sent to the motor driver from the CPU in addition to the drive signal such as a PWM signal. Then, the motor driver drives the motor based on the drive signal sent from the CPU when the start/stop signal indicates the start. Meanwhile, in the motor control device 100 of the present embodiment, as described above, the start/stop signal is fixed to indicate the start in the motor driver 110 and the drive of the motor M is controlled only with the PWM signal. Thereby, there is no need to send the start/stop signal to the motor driver 110 from the CPU 140, and the cutdown of harnesses between the CPU 140 and the motor driver 110 can be achieved.

In the motor control device 100 or the present embodiment thus configured, desired is taking stricter measures against the erroneous operation during a time when the motor M is not to be driven as compared with the conventional commonly used motor control device. That is, when the abnormality such as a short circuit fault by such as pinching occurs on the harness sending the PWM signal to the motor driver 110 from the CPU 140, the motor driver 110 may cause a serious damage to the motor M as the motor driver 110 attempts to drive the motor M at a maximum control voltage even though it is a time when the motor M is not to be driven. In the conventional commonly used motor control device, the occurrence of the above-mentioned erroneous operation has been a rare case in which the abnormality such as a short circuit fault arises on both the harness sending the PWM signal to the motor driver from the CPU and the harness sending the start/stop signal. Meanwhile, in the case of the configuration of the present embodiment that controls the drive of the motor M only with the PWM signal, the above-mentioned erroneous operation arises only with the occurrence of abnormality such as a short circuit fault on the harness sending the PWM signal.

However, in the motor control device 100 of the present embodiment, when the erroneous operation as mentioned above occurs at a time when the motor M is not to be driven, the CPU 140 instantly detects the erroneous operation from the polarity of the monitored voltage corresponding to the electric current that flows through the motor M, and performs the control of stopping the motor M. Consequently, the inconvenience of causing a serious damage to the motor M by the above-mentioned erroneous operation can be suppressed effectively.

Furthermore, in the motor control device 100 of the present embodiment, the CPU 140 notifies the host CPU that the abnormality has occurred when stopping the motor M. Consequently, by performing such control as displaying a warning of the occurrence of abnormality on the operation panel, the host CPU can prompt the operator to promptly recover the abnormality that is the cause of the erroneous operation of the motor M, for example.

In the motor control device 100 of the present embodiment, when it is determined that the motor M is in a state in which the motor M is rotated from the outside depending on the polarity of the monitored voltage, the CPU 140 notifies the host CPU that the motor M is being rotated from the outside. Consequently, using this notice, the host CPU can perform the control such that a paper jam is being handled is displayed on the operation panel, and determine the timing of starting the processing of inputting the signals of the sensors provided in the sheet conveying path to detecting whether the sheet remains.

In the motor control device 100 of the present embodiment, the polarity of the monitored voltage is determined when the value of the monitored voltage is not within the mask area and is exceeding the reference value, and the control of stopping the motor M and the notice to the host CPU are performed in accordance with the result of the determination. Consequently, an erroneous determination caused by such as the mixture of noise can be effectively prevented.

In the motor control device 100 of the present embodiment, the electric current that flows through the motor M at a time when the motor M is not to be driven is detected using the shunt resistor 130 that is used for the detection of over-current at a time when the motor M is to be driven. Consequently, there is no need to add a new configuration in order to detect the electric current that flows through the motor M at a time when the motor M is not to be driven. Accordingly, the erroneous operation during a time when the motor M is not to be driven can be prevented easily without causing an increase in cost associated with the addition of new configuration.

Second Embodiment

In the above-described first embodiment, it has been described that the CPU 140 of the motor control device 100 notifies the host CPU (one example of "host control device") that the abnormality has occurred when the CPU 140 determines that the motor M is erroneously operating depending on the polarity of the monitored voltage at a time when the motor M is not to be driven. Furthermore, it has been described that the CPU 140 notifies the host CPU that the motor M is being rotated when the CPU 140 determines that the motor M is in a state in which the motor M is rotated from the outside. In the present embodiment, a specific example of the operation of the host CPU that receives such a notice is described. In the following description, the constituent elements common with the first embodiment are given the identical symbols and the redundant explanations are omitted as appropriate.

Figure 7:
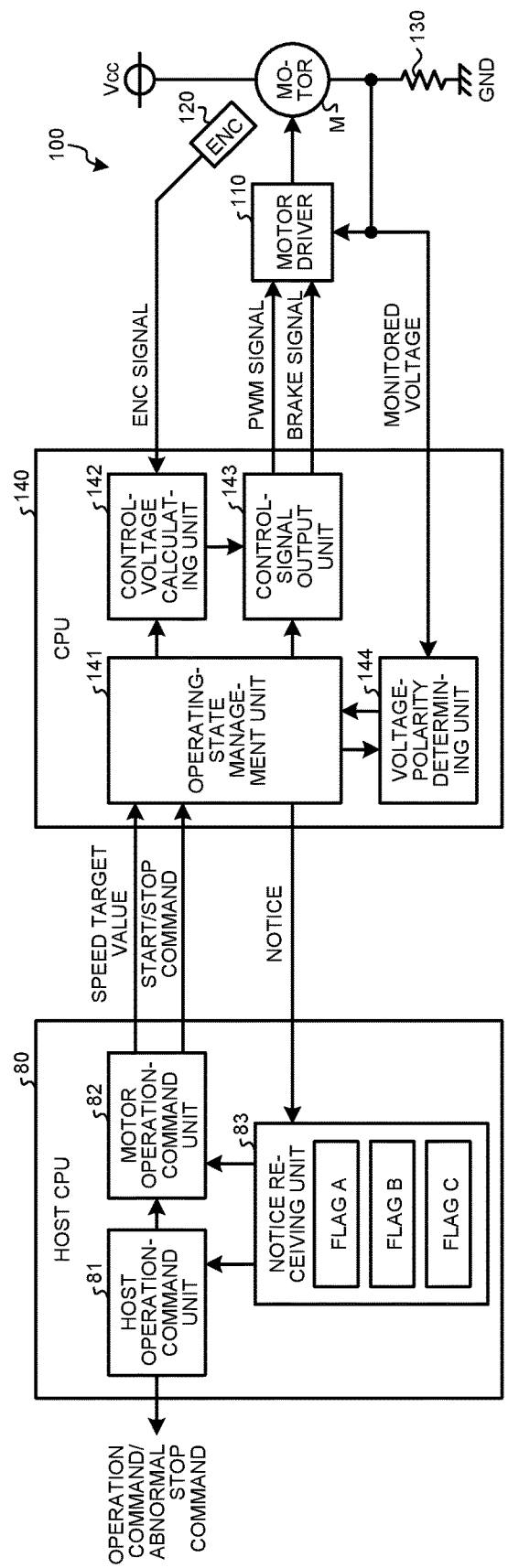
FIG. 7 is a block diagram illustrating an example of the functional configuration of a host CPU.

FIG. 7 is a block diagram illustrating an example of the functional configuration of a host CPU 80 coupled to the CPU 140 of the motor control device 100. As illustrated in FIG. 7, the host CPU 80 includes, as functional constituent elements relating to the motor control device 100, a host operation-command unit 81, a motor operation-command unit 82, and a notice receiving unit 83. These functional constituent elements are implemented by the host CPU 80 executing a predetermined control program, for example. The whole of or a part of these functional constituent elements can also be implemented using not the host CPU 80 that is a general-purpose processor but dedicated hardware such as an ASIC and an FPGA, for example.

The configuration of the motor control device 100 is basically the same as in the above-mentioned first embodiment. However, in the first embodiment, described has been only the behavior in a case in which the flow of electric current through the motor M is detected at a time when the motor M is not to be driven, that is, at the time the motor should be in a stopped state. In the present embodiment, it is assumed that, when abnormality occurs on the motor M while driving the motor M, the CPU 140 of the motor control device 100 detects the abnormality and notifies the host CPU 80 of the abnormality. The example of abnormalities in driving the motor M includes motor lock due to a speed abnormality, and a faulty start-up of being unable to start up in response to a start command, for example. Because the function of detecting abnormality and notifying the host CPU 80 of the abnormality while driving the motor M is a general function of the motor control device 100, the detailed description is omitted.

The host operation-command unit 81 outputs operation commands to the various units of the image forming apparatus 1 so that the image forming apparatus 1 is made into an intended operating state. Furthermore, the host operation-command unit 81 determines whether there is a need to stop the operation of a whole of the image forming apparatus 1 in accordance with a predetermined determination criterion. When necessary, the host operation-command unit 81 outputs an abnormal stop command and stops the overall operation of the image forming apparatus 1. In the present embodiment, in particular, the host operation-command unit 81 determines whether there is a need to stop the overall operation of the image forming apparatus 1 based on flags that the notice receiving unit 83 sets in accordance with the notices received from the CPU 140 of the motor control device 100.

The motor operation-command unit 82 outputs the above-described speed target value and the start/stop command to the CPU 140 of the motor control device 100, in accordance with the commands from the host operation-command unit 81.

The notice receiving unit 83 receives a notice from the CPU 140 of the motor control device 100 and turns on a flag corresponding to the received notice. Specifically, when a notice indicative of abnormality of the motor M is received from the CPU 140 of the motor control device 100 while driving the motor M, the notice receiving unit 83 turns on a flag (hereinafter referred to as "flag A") indicating that the abnormality has occurred while driving the motor M. Furthermore, when a notice indicating that the abnormality has occurred is received from the CPU 140 of the motor control device 100 at a time when the motor M is not to be driven, the notice receiving unit 83 turns on a flag (hereinafter referred to as "flag B") indicating the occurrence of abnormality at a time when the motor M is not to be driven. When a notice indicating that the motor M is being rotated from the outside is received from the CPU 140 of the motor control device 100 at a time when the motor M is not to be driven, the notice receiving unit 83 turns on a flag (hereinafter referred to as "flag C") indicating that the motor M is being rotated from the outside at a time when the motor M is not to be driven.

Any of the flag A, the flag B, and the flag C is binary (one bit) information indicative of on/off, and "1" represents on while "0" represents off, for example. These flags are referred to by the host operation-command unit 81 and the motor operation-command unit 82 as needed each time an event of receiving a notice by the notice receiving unit 83 occurs.

When the flag A is turned on while driving the motor M, the motor operation-command unit 82 outputs the stop command of the motor M to the CPU 140 of the motor control device 100. Thereby, the operating-state management unit 141 of the CPU 140 instructs the control-signal output unit 143 to turn on the brake signal and stops the motor M.

Furthermore, when the flag A is turned on while driving the motor M, or when the flag B is turned on at time when the motor M is not to be driven, the host operation-command unit 81 outputs the abnormal stop command and stops the overall operation of the image forming apparatus 1. Meanwhile, when the flag C is turned on at a time when the motor M is not to be driven, the host operation-command unit 81 lets the overall operation of the image forming apparatus 1 continue without outputting the abnormal stop command. The stopping of the overall operation of the image forming apparatus is performed by such a method as interrupting the power supply to the above-described ADF 1A and the various units of the apparatus main body 1B such as the paper feeding unit 3, the image reading unit and the image forming unit 5, for example. It should be noted that it is desirable that an operation such as performing the warning to the effect that the operation of the image forming apparatus is being stopped due to the occurrence of abnormal is enabled without interrupting the power supply to the host CPU 80 and the operation panel even when the overall operation of the image forming apparatus 1 is stopped.

The above-described flag A, the flag B, and the flag C turned on by the notice receiving unit 83 are reset to off from on, when a predetermined operation by the operator is recovering of abnormality performs a predetermined operation using the operation panel, the flag A and the flag B are reset to off from on. When the operator who performed the handling of a paper jam performs a predetermined operation using the operation panel, the flag C is reset to off from on.

Figure 8:
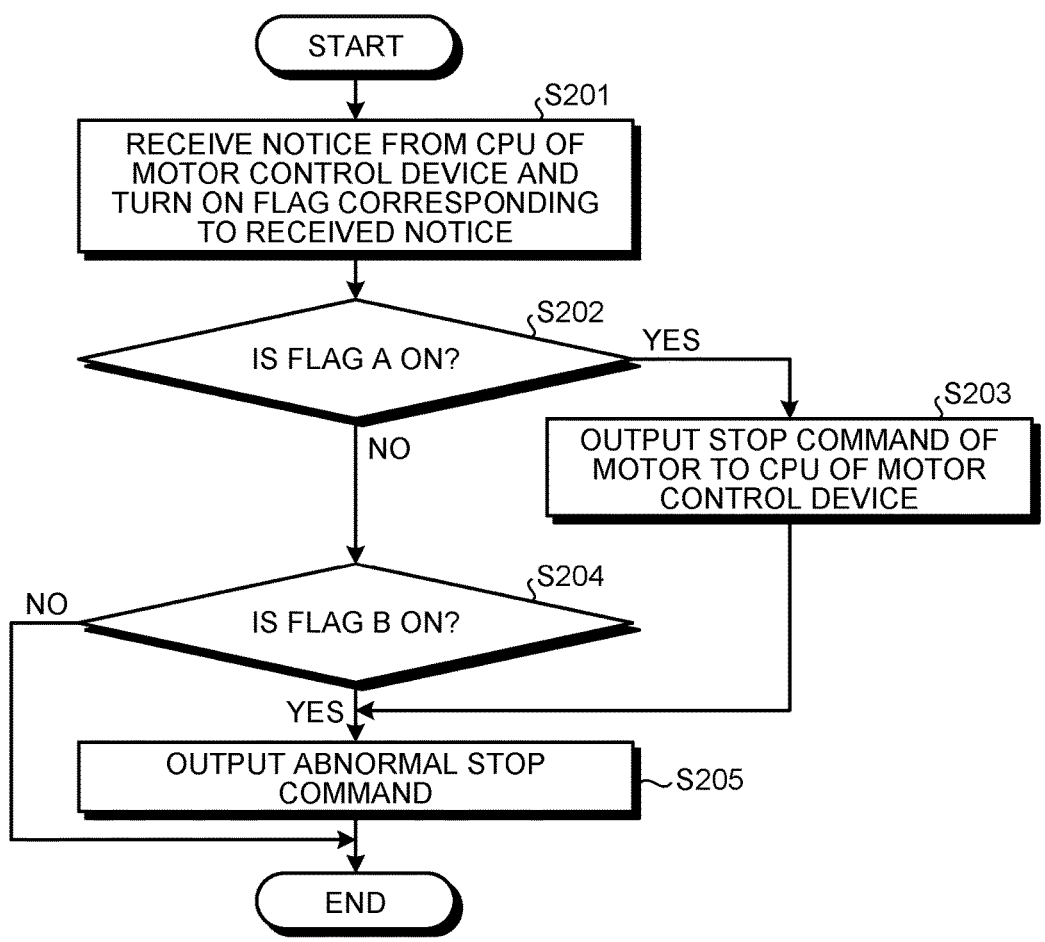
FIG. 8 is a flowchart for explaining one example of a processing sequence executed by the host CPU.

FIG. 8 is a flowchart for explaining one example of a processing sequence executed by the host CPU 80 in response to a notice from the CPU 140 of the motor control device 100. A series of processes illustrated in the flowchart in FIG. 8 repeatedly executed by the host CPU 80 each time the CPU 140 of the motor control device 100 notifies the host CPU 80.

When the host CPU 80 is notified from the CPU 140 of the motor control device 100, the notice receiving unit 83 receives the notice and turns on a flag that corresponds to the received notice (step S201).

Next, is determined whether flag that has been turned on by the notice receiving unit 83 at step S201 is the flag A (step S202). If the flag A has been turned on (Yes at step S202), the motor operation-command unit 82 outputs the stop command of the motor M to the CPU 140 of the motor control device 100 (step S203), and the host operation-command unit 81 outputs the abnormal stop command and stops the overall operation of the image forming apparatus 1 (step S205), and then a series of processes ends.

If the flag that has been turned on by the notice receiving unit 83 at step S201 is not the flag A (No at step S202), it is determined whether the flag is the flag B (step S204). If the flag B has been turned on (Yes at step S204), the host operation-command unit 81 outputs the abnormal stop command and stops the overall operation of the image forming apparatus 1 (step S205), and then a series of processes ends. If the flag that has been turned on by the notice receiving unit 83 at step S201 is not the flag B, that is, when the flag has been turned on (No at step S204), the abnormal stop command is not output by the host operation-command unit 81, and the processing ends in as is.

As described above, in the present embodiment, when a notice indicating that the abnormality has occurred is received from the CPU 140 of the motor control device 100, the host CPU 80 outputs the abnormal stop command and stops the overall operation of the image forming apparatus 1. When a notice indicating that the motor M is being rotated from the outside at a time when the motor M is not to be driven is received, the host CPU 80 lets the overall operation of the image forming apparatus 1 continue without outputting the abnormal stop command. Consequently, when the motor M is rotated from the outside at a time when the motor M is not to be driven, an inconvenience of carelessly stopping the overall operation of the image forming apparatus 1 can be suppressed effectively.

In the above-described first embodiment and the second embodiment, when it is determined that the motor M is erroneously operating at a time when the motor M is not to be driven, the CPU 140 of the motor control device 100 stops the motor M regardless of the commands from the host CPU 80. However, when it is determined that the motor M is erroneously operating at a time when the motor M is not to be driven, and when the notice receiving unit 83 of the host CPU 80 receives a notice indicating that the abnormality has occurred at time when the motor M is not to be driven and turns on the flag B, the motor operation-command unit 82 of the host CPU 80 may output the stop command of the motor M to the CPU 140 of the motor control device 100. The operating-state management unit 141 of the CPU 140 that received the stop command then may instruct the control-signal output unit 143 to turn on the brake signal and stops the motor M.

Furthermore, in the above-described second embodiment, when a notice indicating that the abnormality has occurred at a time when the motor M not to be driven is received from the CPU 140 of the motor control device 100, the host CPU 80 outputs the abnormal stop command and stops the overall operation of the image forming apparatus 1. However, the host CPU 80 may output the abnormal stop command and stop the overall operation of the image forming apparatus 1 only when a notice indicating that the abnormality has occurred while driving the motor M is received, and the host CPU 80 may let the overall operation of the image forming apparatus 1 continue without outputting the abnormal stop command when a notice indicating that the abnormality has occurred at a time when the motor M is not to be driven is received.

In the foregoing, the specific embodiments according to the present invention have been described. The present invention, however, is not limited to the above-mentioned embodiments without change, and the present invention can be embodied while adding various modifications without departing from the scope of the invention. The following illustrates several modifications.

First Modification

Figure 9:
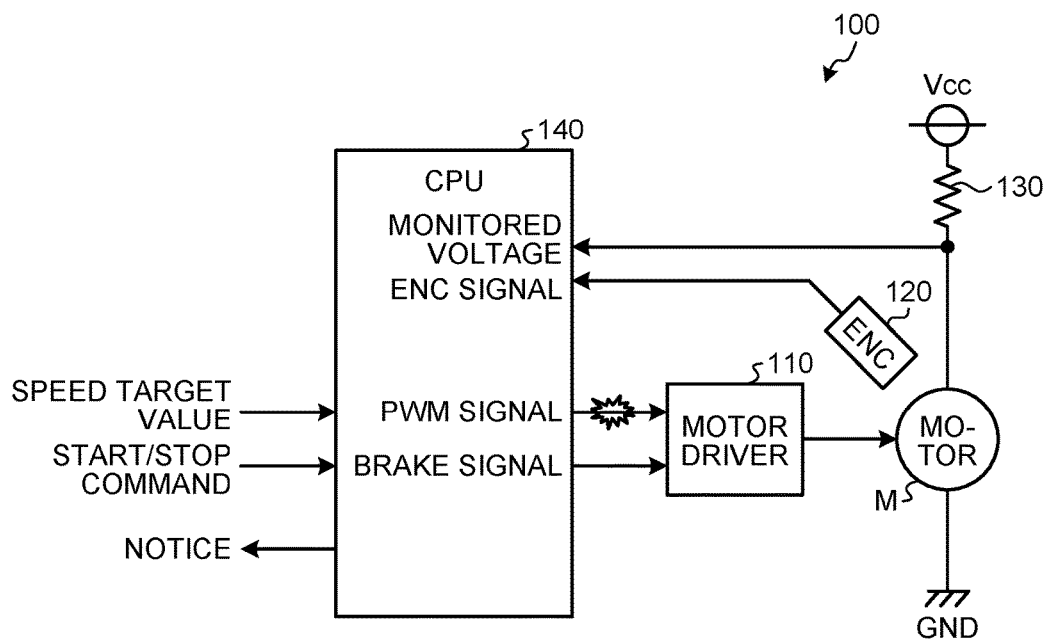
FIG. 9 is hardware configuration diagram of modification in which a shunt resistor is provided on a motor power supply side.

Although the electric current that flows at a time when the motor M is not to be driven is detected with the shunt resistor 130 that is connected in series between the motor M and the ground GND in the above-described embodiments, the shunt resistor 130 may be connected between the motor power supply Vcc and the motor M. FIG. 9 is a hardware configuration diagram of a modification in which the shunt resistor 130 is provided on the motor power supply Vcc side. Even when the shunt resistor 130 is connected in series between the motor power supply Vcc and the motor M as illustrated in FIG. 9, the same effect as in the above-described embodiments can be obtained by inputting the potential difference at both ends of the shunt resistor 130 to the CPU 140 as the monitored voltage.

Second Modification

Figure 10:
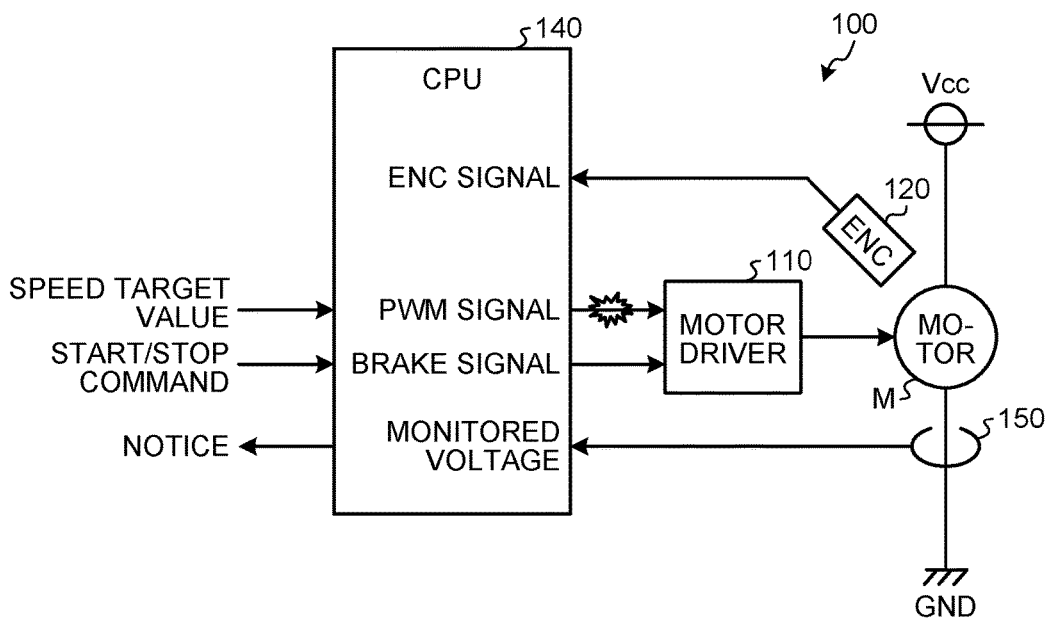
FIG. 10 is a hardware configuration diagram of a modification in which a hall sensor is provided in place of the shunt resistor.

Although the electric current that flows at a time when the motor M is not to be driven is detected with the shunt resistor 130 in the above-described embodiments, the electric current that flows at a time when the motor M is not to be driven may be detected using an electric-current detection unit of other methods. FIG. 10 is a hardware configuration diagram of a modification in which a hall sensor 150 is provided in place of the shunt resistor 130. A hall sensor is an electric current sensor using a hall element that is a magneto-electric conversion element utilizing the Hall effect. Even when the hall sensor 150 is provided in place of the shunt resistor 130 as illustrated in FIG. 10, the same effect as in the above-described embodiments can be obtained by inputting the voltage corresponding to the electric current detected by the hall sensor 150 to the CPU 140 as the monitored voltage.

Third Modification

Although the image forming apparatus 1 configured as a tandem color copying machine of an intermediate transfer system is employed, as one example of the image forming apparatus to which the present invention is applicable in the above-mentioned embodiments, the present invention is widely applicable to image forming apparatuses of various types. Furthermore, the present invention is applicable effectively to a paper feeder that is externally connected to the image forming apparatus 1, and others.

Figure 11:
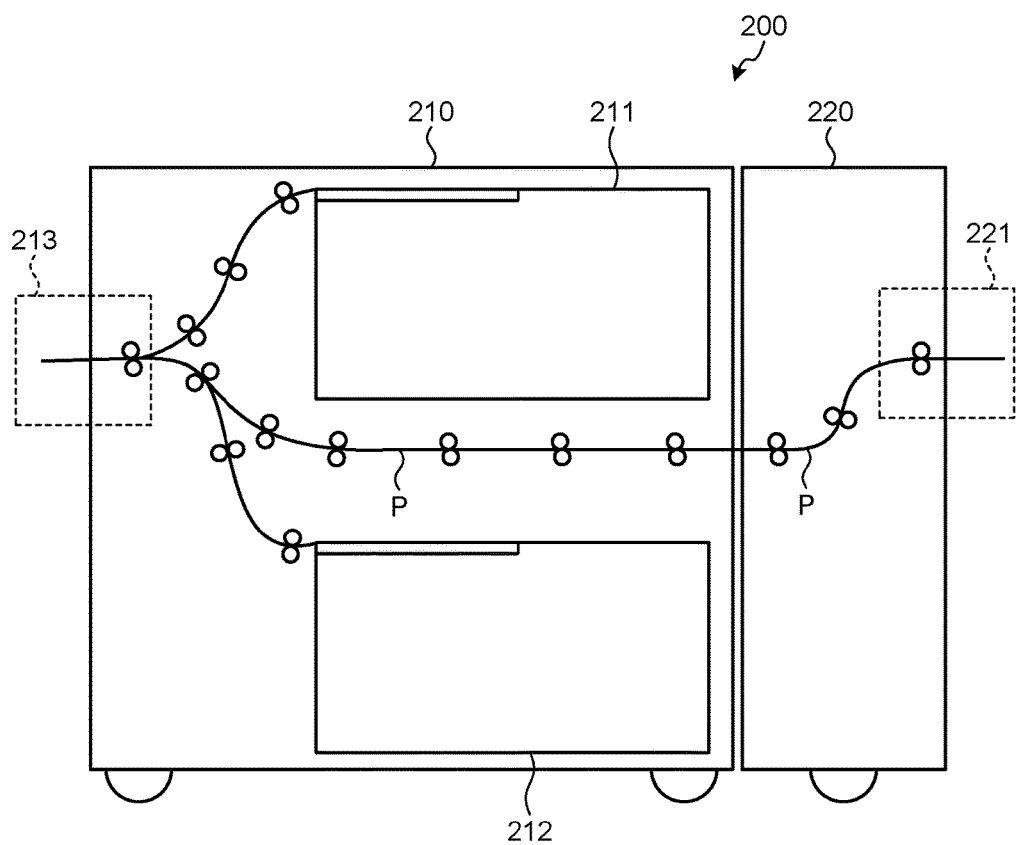
FIG. 11 is a schematic configuration view illustrating a paper feeder connected to the image forming apparatus.

FIG. 11 is a schematic configuration view illustrating a paper feeder 200 connected to the image forming apparatus 1. As illustrated in FIG. 11, the paper feeder 200 includes a paper feeding main unit 210 and a relay unit 220, and is configured such that a plurality of paper-feeding main units 210 can be connected in series via the relay units 220. The paper-feeding main unit 210 conveys along a conveying path P the paper selectively taken out from paper feeding trays 211 and 212, or the paper from the upstream paper-feeding main unit 210 that is connected in series via the relay unit 220, and feeds the paper to the image forming apparatus 1 connected via a connection unit 213. The relay unit 220 is connected to the upstream paper-feeding main unit 210 via a connection unit 221 and conveys to the downstream paper-feeding main unit 210 the paper that is fed from the upstream paper-feeding main unit 210.

The paper feeder 200 thus configured makes roller members, which are provided along the conveying path P, rotate by the power of a motor and conveys the paper that is one example of a sheet. The erroneous operation during a time when the motor is not to be driven can be easily prevented as in the above-described embodiments by applying the present invention to such a paper feeder 200.

Furthermore, the present invention is applicable to, not limited to the image forming apparatus 1 and the paper feeder 200, a variety of sheet conveying devices that rotates roller members by the power of a motor to convey sheets. For example, the present invention is applicable to a variety of sheet conveying devices. The examples of the sheet conveying devices include a device that rotates roller members by the power of a motor to convey paper money, a device that rotates roller members by the power of a motor to convey business forms, a device that rotates roller members by the power of a motor to convey tickets and admission tickets, and a device that rotates roller members by the power of a motor to convey resin sheets or metal sheets.

An embodiment provides an effect that the erroneous operation during a time when the motor is not to be driven can be prevented easily.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (AC), digital signal processor (DSP), field programmable gate array (FPGA) and conventional circuit components arranged to perform the recited functions.

What is claimed is:

1. A motor control device comprising:
an electric-current detection unit configured to detect an electric current that flows toward a ground from a power supply passing through a motor at a time when the motor is not to be driven;
a voltage-polarity determining unit configured to determine a polarity of a voltage corresponding to the detected electric current; and
an operating-state management unit configured to perform control of the motor depending on the polarity of the voltage corresponding to the detected electric current, including controlling stopping the motor in response to the polarity of the voltage being positive.

2. The motor control device according to claim 1, wherein the operating-state management unit notifies a host control device that the motor is being rotated from outside in response to the polarity of the voltage being negative.

3. The motor control device according to claim 1, wherein the electric-current detection unit is a shunt resistor used for detection of over-current during a time when the motor is to be driven.

4. A sheet conveying device comprising:
the motor control device according to claim 1;
the motor; and
a roller member configured to rotate by power of the motor and convey a sheet.

5. An image forming apparatus comprising:
the sheet conveying device according to claim 4; and
an image forming unit configured to form an image on the conveyed sheet.

6. A motor control device comprising:
an electric-current detection unit configured to detect an electric current that flows toward a ground from a power supply passing through a motor at a time when the motor is not to be driven;
a voltage-polarity determining unit configured to determine a polarity of a voltage corresponding to the detected electric current; and
an operating-state management unit configured to perform control of stopping the motor depending on the polarity of the voltage, and
notify a host control device that an abnormality has occurred in response to stopping the motor.

7. A motor control device comprising:
an electric-current detection unit configured to detect an electric current that flows toward a ground from a power supply passing through a motor at a time when the motor is not to be driven;
a voltage-polarity determining unit configured to determine a polarity of a voltage corresponding to the detected electric current in response to a value of the voltage exceeding a reference value; and
an operating-state management unit configured to perform control of stopping the motor depending on the polarity of the voltage.

8. A motor control device comprising:
an electric-current detection unit configured to detect an electric current that flows toward a ground from a power supply passing through a motor at a time when the motor is not to be driven;
a voltage-polarity determining unit configured to determine a polarity of a voltage corresponding to the detected electric current;
an operating-state management unit configured to perform control of stopping the motor depending on the polarity of the voltage;
a control-signal output unit configured to output a drive signal corresponding to a control voltage to be applied to the motor and a brake signal to stop the motor; and
a motor driver configured to drive the motor based on the drive signal and interrupt power to the motor in response to the brake signal being turned on, wherein the operating-state management unit is configured to instruct the control-signal output unit to turn on the brake signal to stop the motor.

9. The motor control device according to claim 8, wherein:
the motor driver includes a first terminal for inputting the drive signal, a second terminal for inputting the brake signal, and a third terminal for inputting a start/stop signal, and drives the motor based on the input drive signal in response to the start/stop signal indicating a start,
the first terminal for inputting the drive signal and the second terminal for inputting the brake signal are coupled to the control-signal output unit via respective harnesses, and
an output to the third terminal for inputting the start/stop signal is fixed to indicate the start.

10. The motor control device according to claim 9, wherein the second terminal for inputting the brake signal is made such that the brake signal is fixed to on in response to an abnormality occurring on a harness connecting the second terminal and the control-signal output unit.

11. The motor control device according to claim 8, wherein the electric-current detection unit is a shunt resistor used for detection of over-current during a time when the motor is to be driven.

12. A sheet conveying device comprising:
the motor control device according to claim 8;
the motor; and
a roller member configured to rotate by power of the motor and convey a sheet.

13. An image forming apparatus comprising:
the sheet conveying device according to claim 12; and
an image forming unit configured to form an image on the conveyed sheet.

14. A sheet conveying device comprising:
a motor;
a motor control device; and
a host control device,
the motor control device comprising:
- an electric-current detection unit configured to detect an electric current that flows through the motor at a time when the motor is not to be driven;
- a voltage-polarity determining unit configured to determine whether the motor is erroneously operating depending on polarity of a voltage corresponding to the detected electric current; and
- an operating-state management unit configured to notify the host control device that abnormality has occurred in response to the motor being determined to be erroneously operating, and notify the host control device that the motor is being rotated from outside in response to the motor being determined to be not erroneously operating, the host control device comprising a host operation-command unit configured to output an abnormal stop command to stop overall operation of the sheet conveying device in response to notification that the abnormality has occurred from the operating-state management unit, and cause the sheet conveying device to continue to operate without outputting the abnormal stop command in response to notification that the motor is being rotated from outside from the operating-state management unit.

15. The sheet conveying device according to claim 14, wherein the operating-state management unit performs control of stopping the motor in response to the motor being determined to be erroneously operating.

16. The sheet conveying device according to claim 15, wherein
the host control device further comprises a motor operation-command unit configured to output a stop command of the motor to the operating-state management unit in response to notification that the abnormality has occurred from the operating-state management unit, and
the operating-state management unit performs control of stopping the motor in response to the stop command output from the motor operation-command unit.

17. An image forming apparatus comprising:
the sheet conveying device according to claim 14; and
an image forming unit configured to form an image on a conveyed sheet,
the abnormal stop command output by the host operation-command unit being configured to stop overall operation of the image forming apparatus.

* * * * *